(12) United States Patent
Mukherjee

(10) Patent No.: US 7,574,568 B2
(45) Date of Patent: Aug. 11, 2009

(54) OPTIONALLY PUSHING I/O DATA INTO A PROCESSOR'S CACHE

(75) Inventor: Shubhendu S. Mukherjee, Framingham, MA (US)

(73) Assignee: Intel Corporation, Santa Clara, CA (US)

(*) Notice: Subject to any disclaimer, the term of this patent is extended or adjusted under 35 U.S.C. 154(b) by 466 days.

(21) Appl. No.: 11/005,970

(22) Filed: Dec. 6, 2004

(65) Prior Publication Data

US 2006/0123195 A1 Jun. 8, 2006

(51) Int. Cl.
*G06F 12/00* (2006.01)
(52) U.S. Cl. .................................... 711/143
(58) Field of Classification Search .................. None
See application file for complete search history.

(56) References Cited

U.S. PATENT DOCUMENTS

| | | | |
|---|---|---|---|
| 5,551,005 A | 8/1996 | Sarangdhar et al. | |
| 5,652,846 A * | 7/1997 | Sides | 710/108 |
| 6,192,432 B1 * | 2/2001 | Slivka et al. | 710/68 |
| 6,438,660 B1 * | 8/2002 | Reams | 711/143 |
| 6,711,650 B1 * | 3/2004 | Bohrer et al. | 711/118 |
| 2002/0178334 A1 * | 11/2002 | Palanca et al. | 711/158 |
| 2003/0009623 A1 * | 1/2003 | Arimilli et al. | 711/119 |
| 2003/0191902 A1 | 10/2003 | Snyder et al. | |
| 2004/0199727 A1 | 10/2004 | Narad | |

OTHER PUBLICATIONS

Handy, Jim. "The Cache Memory Book", 2nd Edition, p. 150-151, Academic Press, 1998.*
Lai et al. "Memory Sharing Predictor: The Key to a Speculative Coherent DSM", Compurter Architecture News, ACM, New York, NY, US, vol. 27, No. 2, May 1999, p. 172-183.*
Milenkovic et al. "Cache Injection on Bus Based Multiprocessors", Proceedings Seventeenth IEEE Sumposium, Oct. 1998, p. 341-346.*
European Patent Office, International Search Report and Written Opinion for International Application No. PCT/US2005/043732, 11 pages, May 8, 2006.
An-Chow Lai et al., "Memory Sharing Predictor: The Key to a Speculative Coherent DSM," ACM Computer Architecture News, vol. 27, No. 2, pp. 172-183, May 1999.

* cited by examiner

*Primary Examiner*—Brian R Peugh
(74) *Attorney, Agent, or Firm*—Joseph P. Curtin; Cool Patent, P.C.

(57) ABSTRACT

A method, an apparatus and a system for a computing system implements a technique known as cache push that enhances a single writer invalidation protocol with the ability to optionally push data into another processor's cache without changing the memory consistency model being utilized by the method, apparatus and system.

22 Claims, 4 Drawing Sheets

OPTIONALLY PUSHING I/O DATA INTO A PROCESSOR'S CACHE

BACKGROUND INFORMATION

Processors used in computing systems, for example internet services, operate on data very quickly and need a constant supply of data to operate efficiently. If a processor needs to obtain data from memory that is not in the processor's internal cache, it could result in may idle processor clock cycles while the data is being retrieved. Some prior art caching schemes that try to improve processor efficiency involve pushing data into a cache as soon as it is written into memory. One problem with these prior art schemes is that if the data is not needed until some time later, it may be overwritten and would need to be fetched from memory again thereby wasting interconnect bandwidth. Another problem with these prior art schemes is that in a multiprocessor system it would not always be possible to determine which processor will need the data.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the inventions.

DETAILED DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the, benefit of the present disclosure that the various aspects of the invention may be practiced in other examples that depart from these specific details. In certain instances, descriptions of well-known devices, circuits, and methods are omitted so as not to obscure the description of the present invention with unnecessary detail.

Embodiments of the present invention are generally directed to a method, apparatus and system for a computing system implementing a technique known as cache push. The cache push technique enhances a single writer invalidation protocol with the ability to optionally push data into another processor's cache without changing the memory consistency model. The memory consistency model may be a sequential consistency ordering model. Sequential consistency model is a memory access ordering model that may require that the execution of programs on different processors should appear as some interleaving of the execution of the programs in one processor. A sequential consistency access model may be satisfied if for each processor no reads or writes are re-ordered with respect to previous reads or writes from the same processor.

By having the cache push technique integrate seamlessly without changing the consistency model, it avoids changes to any other parts of the computing system or to the programming model for the machine. In addition, the cache push may be under the control of the pushing (or producer) cache or device and, therefore, may be optimized to avoid waste of interconnect bandwidth. Furthermore, pushing data into another processor's cache at the appropriate time has the advantage of improving performance by moving data closer to a processor when needed.

Figure 1:
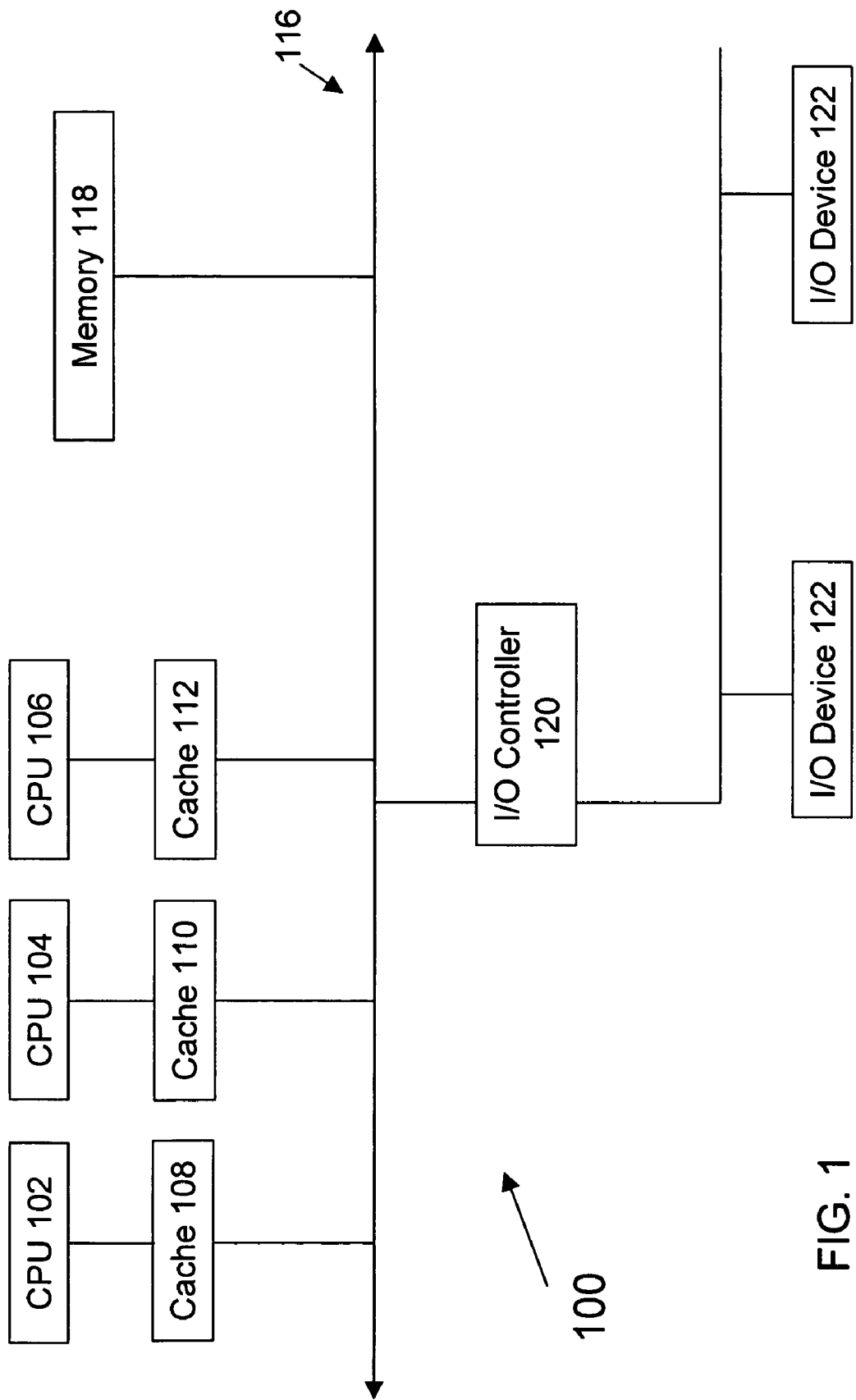
FIG. 1 is a block diagram of an example computing system for implementing a cache push in accordance with one embodiment of the invention.

FIG. 1 is a block diagram of an example computing system suitable for implementing a cache push in accordance with one embodiment of the invention. Computing system 100 is intended to represent any of a wide variety of traditional and non-traditional computing systems, servers, network switches, network routers, wireless communication subscriber units, wireless communication telephony infrastructure elements, personal digital assistants, set-top boxes, or any electronic appliance that would benefit from the teaching of the present invention. In accordance with the illustrated embodiment, computing system 100 may include one or more processor(s) 102, 104, 106; caches 108, 110, 112; bus 116; memory 118 and I/O controller 120.

The processors 102, 104, 106 may represent any of a wide variety of control logic including, but not limited to one or more of a microprocessor, a programmable logic device (PLD), programmable logic array (PLA), application specific integrated circuit (ASIC), a microcontroller, and the like, although the present invention is not limited in this respect. In one embodiment, computing system 100 may be a web server, and the processors may be one or more Intel Itanium 2 processors.

In yet another embodiment, the computing system 100 may be a multiple chip card, board, or the like, or a multiprocessor component such as a chip multiprocessor or multiple chip modules. A chip multiprocessor is a single integrated circuit which contains multiple processing cores, with each processing core being a process capable to executing instructions.

Caches 108, 110, 112 are coupled to the processors 102, 104, 106, respectively. The processors may have internal cache memory for low latency access to data and instructions. When data or instructions that are needed for execution by a processor are not resident in the internal cache, the processors may attempt to read the data or instructions from memory 118. The caches 108, 110, 112 are coupled to the bus 116, which is also coupled to the memory 118.

The bus 116 may be a point-to-point interconnect or may be a two point or multidrop bus in other embodiments. Various known or otherwise available bus, interconnect, or other communication protocols may be employed to allow communications with other external components such as memories, other processors, I/O components, bridges, etc.

The embodiment of the computing system of FIG. 1 may include a plurality of processors and a plurality of caches. These processors and caches comprise a multiprocessor system in which the caches are kept coherent with one another through a cache coherence mechanism. The cache coherence protocol may be implemented in the processor caches and memory interconnects to keep the caches coherent. This cache coherence mechanism may include additional cache coherence control lines within the bus 116.

The memory 118 may represent any type of memory device used to store data and instructions that may have been or will be used by the processors. Typically, though the invention is not limited in this respect, the memory 118 will consist of dynamic random access memory (DRAM). In another embodiment the memory 118 may include a semiconductor memory. In yet another embodiment, memory 118 may include a magnetic storage device such as a disk drive. The present invention, however, is not limited to the examples of memory mentioned here.

The I/O controller 120 is coupled to bus 116. The I/O controller 120 may represent any type of chipset or control logic that interfaces I/O device 122 with other components of the computing system 100. The one or more I/O devices 122 may represent any type of device, peripheral or component that provides input to or processes output from computing system 100. In one embodiment, though the present invention is not so limited, at least one I/O device 122 may be a network interface controller with the capability to perform Direct Memory Access (DMA) operations to copy data into memory 118. In this respect, there may be a software Transmission Control Protocol with Internet Protocol (TCP/IP) stack being executed by processors 102, 104, 106 as a result of a DMA by I/O devices 122 as TCP/IP packets are received. I/O devices 122, in particular, and the present invention in general, are not limited, however, to network interface controllers. In other embodiments, at least one I/O device 122 may be a graphics controller or disk controller, or another controller that may benefit from the teachings of the present invention.

Figure 2:
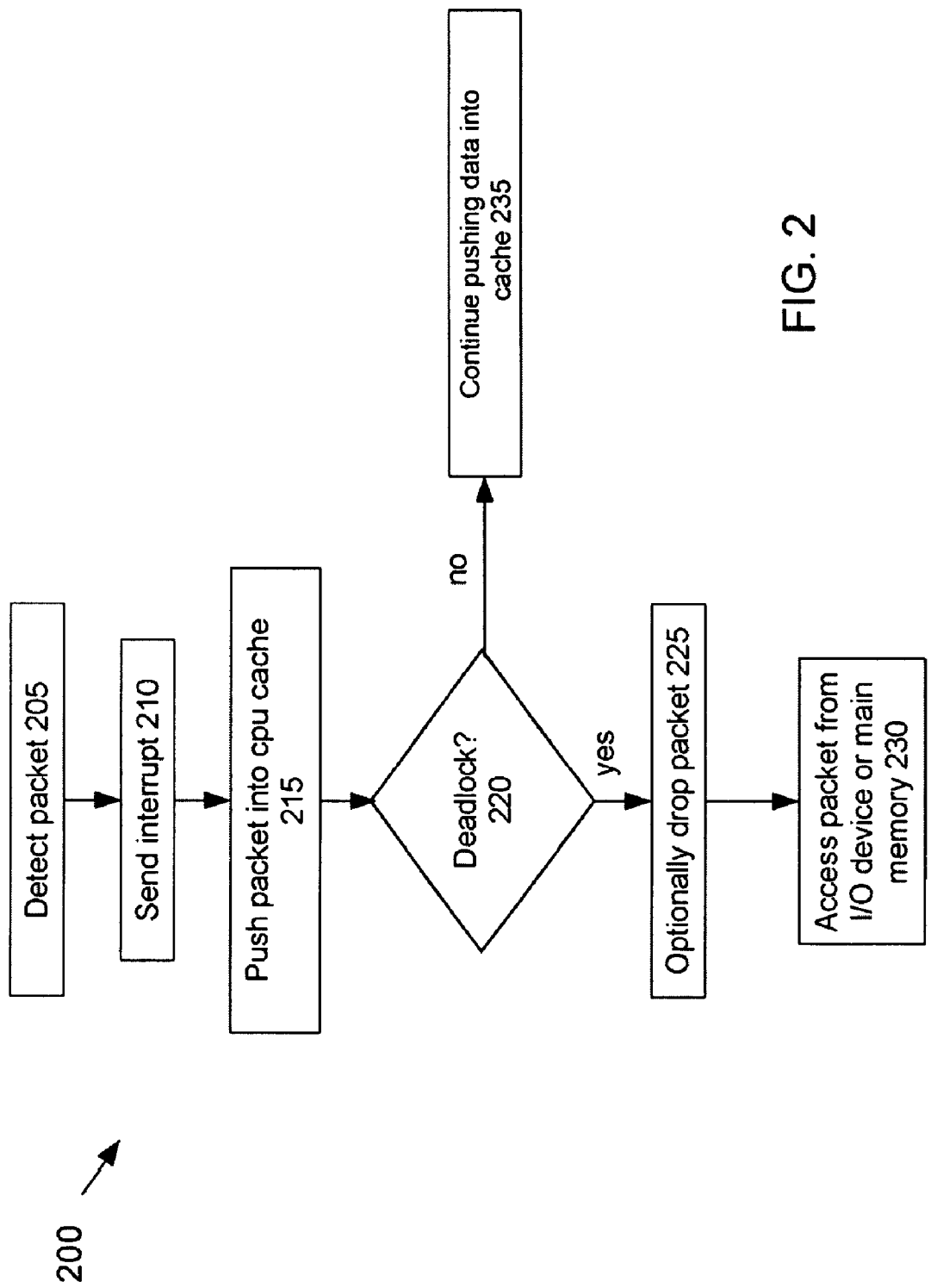
FIG. 2 is a flow chart of an example method performed by the computing system of FIG. 1 to optionally push I/O data into a processor's cache.

FIG. 2 is a flow chart of an example method performed by the computing system of FIG. 1. It will be readily apparent to those of ordinary skill in the art that although the following operations may be described as a sequential process, many of the operations may in fact be performed in parallel or concurrently. In addition, the order of the operations may be re-arranged without departing from the spirit of embodiments of the invention.

According to one implementation, the method 200 of FIG. 2 may begin with the computing system 100 detecting a packet 205 to be written to memory 118 by one of the I/O devices 122. In one embodiment, an I/O device sends a communication to the computing system 100 indicating the details of the packet. In another embodiment, the computing system 100 may detect the packet through monitoring of inbound writes to memory.

Next, an interrupt is sent 210 to a specific processor to notify the processor to access the data. At the time the processor does not know if the packet of data is in the cache or I/O device. Then, at the same time (in the shadow of the interrupt), the I/O device 122 may push the packet directly into the processor's cache 215. By pushing the packet directly into the cache, the computing system 100 may avoid the extra latency incurred by the processor to read the packet from the I/O device. This is particularly critical for computing systems that serve as high-performance routers reading packets from one network interface and re-directing them to yet another network interface.

Once the external packet arrives at the processor's cache, this packet may create a deadlock 220. The deadlock 220 may occur in the storage medium discussed further in FIG. 4. If there is no deadlock, then hardware may optionally push the data into the cache. Thereafter, the processor may access the pushed data directly from its cache 235. However, if there is a deadlock 220, the, processor has the option to drop the data 225, if it does not have space, thereby avoiding the deadlock. The processor may always read the data from memory later 230.

Figure 3:
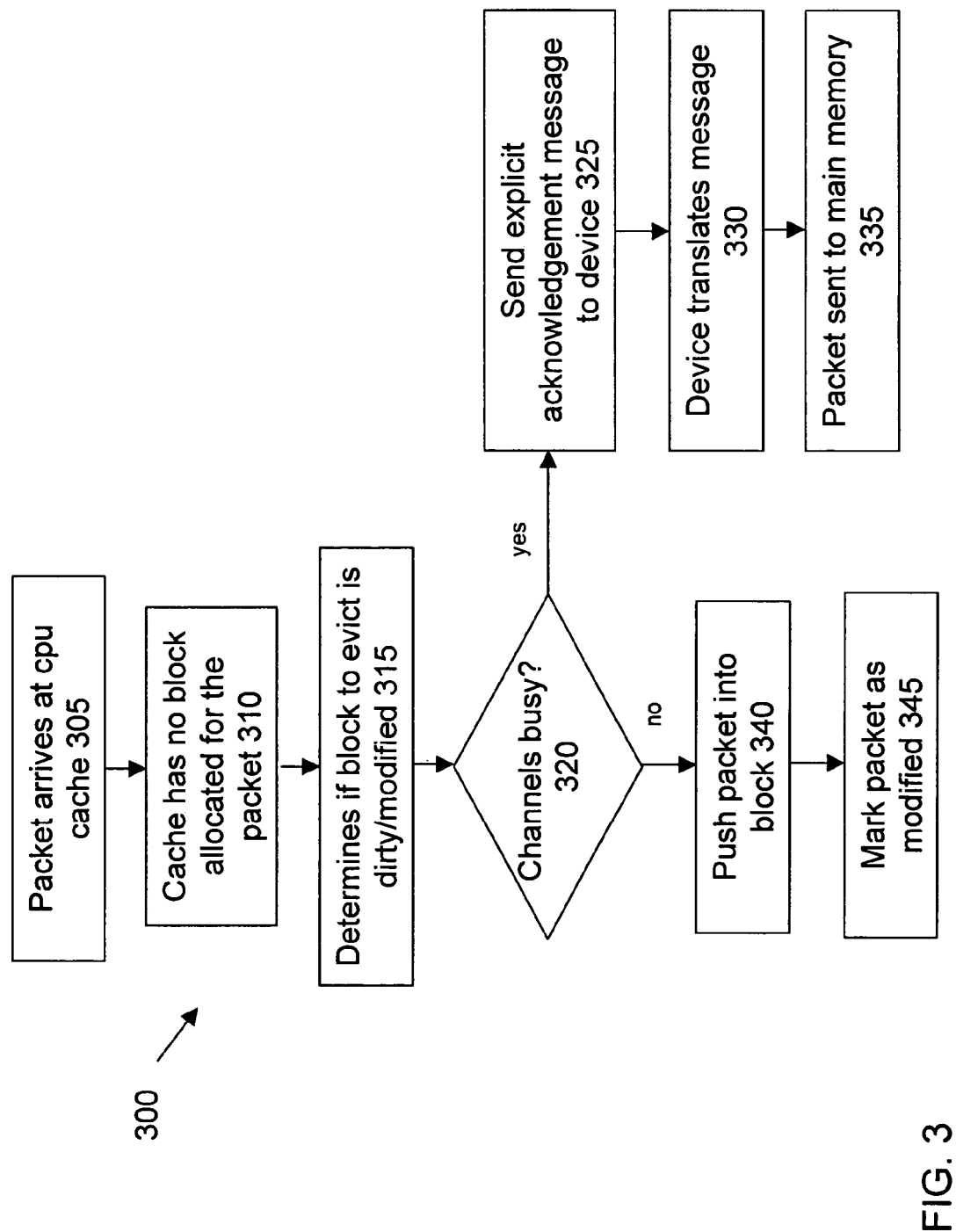
FIG. 3 is a flow chart of an example method performed by the computing system of FIG. 1 to optionally drop I/O data from a processor's cache.

FIG. 3 is a flow chart of an example method performed by the computing system of FIG. 1 when the system decides to optionally drop the data. It will be readily apparent that the order of the operations may be rearranged without departing from the spirit of the embodiments of the invention.

According to one implementation, the method 300 of FIG. 3 may begin with the computing system 10 detecting an external packet arriving at the cache 305. However, the cache may not have a block allocated for the data 310. If the cache does not have a block allocated for the data, then the cache must find a block to evict first 315. If the block to be evicted is dirty/modified and the channels through which the cache may write that data back to memory (e.g., output buffers to the memory interconnect) are busy, then the system may deadlock 320.

If the channels through which the cache may write the data to memory are not busy, then the packet of data is pushed into the block 340 and the data is marked as being modified 345. By labeling the block as being modified, it will enable the cache to know that this data has not been saved in memory.

However, if the channel through which the cache may write the data to memory is busy, then an explicit acknowledgement message is sent to the I/O controller 325. The I/O controller may translate the message to determine where the packet of data came from 330. The data could have been sent from any one of the I/O devices described above. The packet of data is then sent to memory 335 from where the processors may retrieve the data.

Optional drops of the pushed data may be made infrequent for at least the following reasons. First, if an invalid block is already allocated in the cache, the processor may simply mark the block as valid and put the incoming packet in there. This may not require any write-backs of modified data. Second, read-only data often exists in the cache and may be overwritten with the new incoming packet without any write-backs. Third, output buffers to the memory interconnect can be sized properly to buffer enough in-flight packets to reduce the probability of filling up the buffer, thereby causing deadlocks.

In a broadcast-based interconnect, such as a bus or a ring, the caches may snoop on data passing by and absorb the data into its own caches. In a directory-based protocol, however, the producer (e.g., I/O device or processor cache) may direct the data to the specific consuming processor's cache.

Accordingly, the cache push technique of the present invention improves the performance of a multiprocessor system with I/O devices without changing the memory consistency model or wasting excessive memory interconnect bandwidth.

Figure 4:
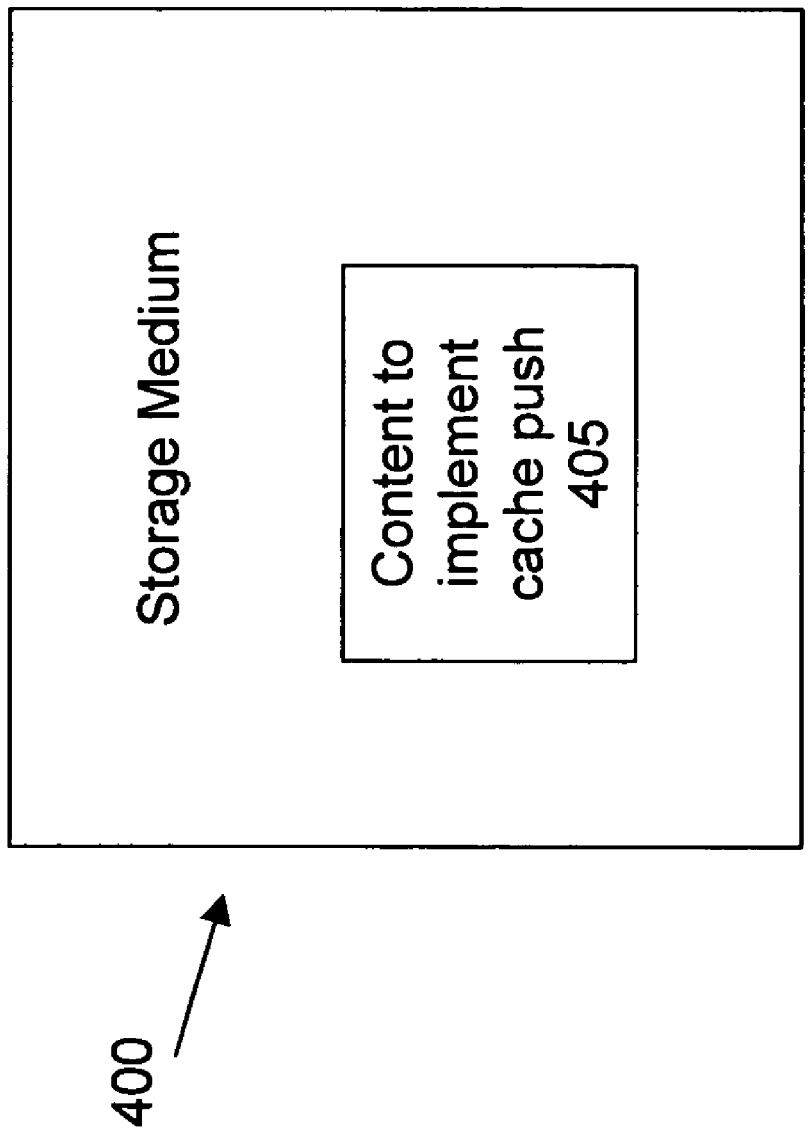
FIG. 4 is a block diagram of an example article of manufacture including content which, when accessed by a device, causes the device to implement one or more aspects of one or more embodiments of the invention.

FIG. 4 illustrates a block diagram of an example storage medium 400 comprising content 405 which, when accessed, causes an electronic appliance to implement one or more aspects of the present invention and/or associated methods 200, 300. In this regard, storage medium 400 includes content 405 (e.g. instructions, data, or any combination thereof) which, when executed, causes the machine to implement one or more aspects of the cache push, described above. The machine readable (storage) medium 300 may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions.

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well-known devices, circuits, and methods are omitted so as not to obscure the description of the present invention with unnecessary detail.

What is claimed is:

1. A method comprising:
pushing data from an input/output (I/O) device directly into a cache of a processor in response to detection of incoming data; and
optionally dropping the data if a deadlock occurs, the deadlock being a condition in which writeback channels for the cache are busy.

2. The method of claim 1, further comprising:
detecting data to be written to memory; and
sending an interrupt.

3. The method of claim 2, wherein the detecting of data is through monitoring of inbound writes to the memory.

4. The method of claim 2, wherein the detecting of data is through sending details of the data to a computing system.

5. The method of claim 2, further comprising:
detecting the deadlock.

6. The method of claim 5, further comprising:
continuing pushing data into the cache of the processor if no deadlock detected.

7. The method of claim 6, further comprising:
accessing the pushed data directly from the cache of the processor.

8. The method of claim 5, further comprising:
sending message to a device regarding dropping the data if deadlock is detected; and
translating the message.

9. The method of claim 8, further comprising:
reading the data from memory if deadlock detected.

10. The method of claim 8, further comprising:
accessing the data from the I/O device if deadlock detected.

11. A system, comprising:
an input/output (I/O) device;
at least one processor coupled to at least one cache; and
a memory device coupled to the I/O device and the at least one processor to store data;
wherein the I/O device pushes data directly into the cache of the processor in response to the detection of incoming data, and the at least one processor is capable of optionally dropping the data if a deadlock occurs, the deadlock being a condition in which writeback channels for the cache are busy.

12. The system of claim 11, wherein the I/O device is a network controller.

13. The system of claim 12, wherein the network controller performs Direct Memory Access (DMA) operations.

14. The system of claim 11, wherein the I/O device sends an interrupt to the processor to notify the processor to access the data.

15. The system of claim 14, wherein the system detects a deadlock.

16. The system of claim 15, wherein the I/O device pushes the data into the cache of the processor if no deadlock is detected.

17. The system of claim 16, wherein the processor access the data directly from its cache.

18. The system of claim 15, wherein the processor reads the data from the memory device if a deadlock is detected.

19. An article of manufacture comprising a storage medium having instructions stored thereon that, when executed by a machine, cause the machine to directly push content into a cache of a processor in response to a memory read by the processor, and optionally drop data if a deadlock occurs, the deadlock being a condition in which writeback channels for the cache are busy.

20. The article of manufacture of claim 19, further comprising instructions which, when executed by the machine, causes the machine to send an interrupt to the processor.

21. The article of manufacture medium of claim 20, further comprising instructions which, when executed by the machine, causes the machine to deadlock.

22. The article of manufacture of claim 21, further comprising instructions which, when executed by the machine, causes the machine to directly push content into a cache of the processor if no deadlock is detected.

* * * * *

UNITED STATES PATENT AND TRADEMARK OFFICE
CERTIFICATE OF CORRECTION

PATENT NO. : 7,574,568 B2
APPLICATION NO. : 11/005970
DATED : August 11, 2009
INVENTOR(S) : Shubhendu S. Mukherjee It is certified that error appears in the above-identified patent and that said Letters Patent is hereby corrected as shown below:

On the title page, item (56), under "Other Publications", in column 2, line 4, delete "Compurter" and insert -- Computer --, therefor.

On the title page, item (56), under "Other Publications", in column 2, line 7, delete "Sumposium," and insert -- Symposium, --, therefor.

Signed and Sealed this

Twenty-seventh Day of October, 2009

David J. Kappos
*Director of the United States Patent and Trademark Office*

UNITED STATES PATENT AND TRADEMARK OFFICE
CERTIFICATE OF CORRECTION

PATENT NO. : 7,574,568 B2  Page 1 of 1
APPLICATION NO. : 11/005970
DATED : August 11, 2009
INVENTOR(S) : Shubhendu S. Mukherjee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 772 days.

Signed and Sealed this

Seventh Day of September, 2010

David J. Kappos
*Director of the United States Patent and Trademark Office*